United States Patent Office 3,447,900
Patented June 3, 1969

3,447,900
DEFLUORINATION OF PHOSPHATE ORES
Mark Allen Kuck, Montclair, N.J., assignor to Stauffer Chemical Company, New York, N.Y., a corporation of Delaware
No Drawing. Filed May 31, 1967, Ser. No. 642,298
Int. Cl. C22b 25/32
U.S. Cl. 23—108                                    13 Claims

ABSTRACT OF THE DISCLOSURE

Defluorination of phosphate ores is accomplished by contacting a fluorine-containing phosphate ore having a moisture content of 1% to 4% by weight, with gaseous sulfur trioxide at ambient temperatures followed by incrementally heating the so-contacted ore in the presence of the sulfur trioxide to a temperature within the range of from 325° C. to 500° C. Preferably, the reaction procedure is repeated by cooling the reaction product to ambient temperatures, adding more moisture and sulfur trioxide thereto followed by heating. The product of the reaction is a phosphate material having an extremely low fluorine content which is useable for agricultural purposes.

---

The present invention relates to an improved method of defluorinating phosphate ores by treatment of fluorine-containing phosphate ore having a moisture content within the range of about 1% to about 4% by weight with sulfur trioxide at ambient temperature, and incrementally heating the resultant mixture to a temperature within the range of about 325° C. to about 500° C. while maintaining the ore in contact with sulfur trioxide. The invention also relates to the product produced by the method which is a phosphate material having a sufficiently low fluorine content to allow the use of the material in the agricultural field for such purposes as animal feed supplements.

Raw phosphate ores generally consist of fluorapatite which can be represented by the formula $Ca_{10}(PO_4)_6F_2$. These phosphate ores have prime utility in the area of fertilizer materials and as feed additives. However, and due to the toxic effects of the fluorine, the phosphate ore cannot be used directly as a feed additive without effecting a removal of the fluorine.

Many processes have been presented for removing the fluorine from the fluorapatite ore. These processes are generally rather expensive procedures requiring the use of highly elevated temperatures, long reaction times, or the use of expensive chemical additives. Present commercial processes require the use of temperatures of at least 1500° C. to effect the desired elimination of fluorine.

Because of the cost of operating a process at extremely elevated temperatures, the art has recognized the economic desirability of having a defluorination process which would proceed at lower temperatures. One such process is disclosed in German Patent 966,264 issued August 8, 1957. This process comprises treating phosphate ores at temperatures between 500° C. and 1100° C. with sulfur dioxide, oxygen and steam in the presence of a catalyst known to accelerate the oxidation of sulfur dioxide to sulfur trioxide. The preferred temperature range is above 700° C. The process effects defluorination of the ore and increases the available phosphate content thereof to provide fertilizer and feed additive products. While this process is operable at somewhat lower temperatures than that normally used, the preferred temperatures (about 700–900° C.) are still extremely high. The process also, in its preferred form, requires the addition of a catalyst to the ore which remains as a process impurity.

In accordance with the present invention, it has now been found that substantially all the fluorine values can be economically and easily removed from fluorine-containing phosphate ore by contacting an ore having a regulated moisture content within the range of about 1% to about 4% by weight based on the total weight of the ore, with sulfur trioxide at ambient temperatures followed by incrementally heating the so-contacted ore to an elevated temperature within the range of about 325° C. to about 500° C. while maintaining the ore in contact with sulfur trioxide and continuing the heating and the sulfur trioxide contact of the ore at the elevated temperature for a period of time sufficient to effect the desired defluorination. Preferably, and in order to insure as complete a removal of the fluorine values as possible, the reaction product is recycled by cooling the reaction product to ambient temperature, adding additional moisture to the reaction product to obtain the prescribed regulated moisture content of about 1% to about 4% by weight followed by treating the product with sulfur trioxide in accordance with the procedure given above. The defluorinated product has a sufficiently low fluorine content so as to allow the product to be used as an additive for animal feeds.

As used herein, the term ambient temperature is intended to include temperatures relatively low in comparison to the temperatures used in the final stages of the process. As such, the term ambient temperature is intended to include temperatures within the range of about 10° C. to about 60° C. unless otherwise stated. As used herein all parts and percentages are by weight unless otherwise stated.

Any naturally occurring fluorine-containing phosphate ores can be effectively defluorinated by the method of the present invention. As a specific example, Florida fluorapatite ore has been found to be particularly useful in the method of the present invention. These phosphate ores generally have a fluorine content of above 3% by weight which limits the use of these ores as feed supplements.

Prior to effecting the defluorination of the phosphate ore, the ore which may contain undesirable elements such as sand, mud and organic matter depending upon the ore deposit from which the ore is taken should be purified of undesirable elements by such procedures as washing and the like which are well known to those skilled in the art of mining. Also, it may be desirable to subject the ore to elevated temperature for a time sufficient to kill organic matter which may have an effect on animals if the product is to be used as a feed supplement. These operations are optional and can be done as desired.

Following the purification of the ore, the ore is ground and graded into sizes. Ores of less than approximately 30 mesh are generally more desirable for the use of feed supplements. It is preferred that the particle size be from 100 to about 300 mesh and most preferably from 100 to 200 mesh in that the smaller size particle provides more complete intimate contact of the ore with sulfur trioxide so as to facilitate the defluorination of the ore. Also, the smaller particle size is more esaily adaptable to be utilized and handled as a feed supplement. As used herein, the mesh sizes are U.S. Standard Sieve Sizes and correspond to ASTM specifications.

For use in the present invention, the phosphate ore reactant is required to have a natural or adjusted moisture content within the range of approximately 1% to 4% by weight, based on the total weight of the phosphate ore and preferably a moisture content of above 2%. Following the grading of the ore, the moisture content is determined by known analytical methods prior to the reaction of the ore with sulfur trioxide so that the moisture content can be adjusted within the prescribed limits of about 1% to about 4% by weight. The moisture content requirement can, in some instances, be satisfied by the naturally occurring moisture in the ore. If the moisture content is below these limits, additional moisture can be added as is necessary to bring the moisture content of the ore within the prescribed limits. Should the ore have over approximately 4% by weight moisture content, slight drying can be utilized to remove the excess moisture to bring the moisture content within the prescribed range. Phosphate ores, such as Florida fluorapatite, following the normal grinding and grading procedures do not contain sufficient moisture to allow their use in the defluorination method of the present invention. The moisture content of the ore is conveniently increased to a point within the prescribed moisture content limits by making a slurry of the ground ore and allowing the slurry to air-dry. The air-dried product, which tends to cake, is then pulverized to provide an ore particle of the desired particle size. Grading of the ore particles and adding additional moisture can be accomplished in a single step by the use of ore flotation techniques. Washing techniques used to remove fines can also provide the necessary additional moisture. The foregoing are given as illustrative of the numerous means which can be used to increase where necessary the moisture content of the phosphate ore to a level of about 1% to about 4% by weight. The main purpose of these preparatory methods is to provide a graded fluorine-containing phosphate ore of a particle size of less than 40 mesh which has a moisture within the range of about 1% to about 4% by weight and any physical treatments which can be adapted to accomplish this end are intended to be useful in the performance of the present invention.

The graded ore with the proper moisture content is then reacted with sulfur trioxide. The sulfur trioxide can be, in the initial stages of the reaction, used in the form of a liquid or a gas and can be purchased commercially or prepared on site as desired. Preferably, an excess of that amount required for reaction is used. The use of sulfur trioxide in vapor form is preferred in that the overall processing of the ore is simplified.

The reaction can be conducted as a batch process or as a continuous manufacturing process as desired. Sealed or closed vacuum reaction kettles having stirring paddles and heating mantles are conveniently used for batch processes. Since the reaction mixture of sulfur trioxide and ore is incrementally heated to above about 325° C. while maintaining contact with the sulfur trioxide, a temperature far above the boiling point of the sulfur trioxide, inlet means for additional sulfur trioxide, preferably in the from of vapor, are attached to the kettle. Gaseous sulfur trioxide can be effectively utilized in a fluidized bed reaction column. This type of processing equipment is easy to operate, allows for the rapid introduction of the sulfur trioxide into the system, temperature control is easily effected and removal of by-product fluorine values from the system is facilitated by the upward flow of the vaporous sulfur trioxide. Also, the fluidized bed is adaptable to continuous manufacturing techniques wherein the sulfur trioxide from one column could be purified and pumped into the bottom of a second column and so forth thereby gaining more effective use of the sulfur trioxide reactant. These are set forth as illustrative of the various types of processing equipment which can be utilized by one skilled in the art to perform the process of the present invention.

In the use of the preferred fluidized bed processing, particles size of the ore is important for effective fluidization. Particle sizes within the ranges of 30 mesh to 300 mesh are preferred for this use. Ores having mixed particle sizes within this range are most effective in the fluidized bed process.

The sulfur trioxide treatment of the phosphate ore begins at temperatures appropriate to maintain the sulfur trioxide in the desired physical form. In using the liquid form, temperatures between the ranges of 18° to 45° are appropriate and in utilizing the vapor form, temperatures above 45° C. can be used. Also, sulfur trioxide in its vaporized form can be formed by bubbling an inert carrier gas such as air or nitrogen through liquid sulfur trioxide or oleum and this can be accomplished at low temperatures.

The initial contact of the sulfur trioxide of the phosphate ore is accomplished at temperatures within the range of 10° to 60° C. The sulfur trioxide should be allowed to contact the phosphate ore for a period of time sufficient to insure thorough saturation of the phosphate ore. This is done in order to insure the greatest possible efficiency of the defluorination reaction. A contact time of about 30 minutes, especially when using the fluidized bed reaction technique, has been found to be effective.

Following the initial contact step, the phosphate ore is incrementally heated to a temperature within the range of about 325° C. to about 500° C. while maintaining the ore in contact with the sulfur trioxide to effect the defluorination of the phosphate ore. The defluorination of the phosphate ore has been found to be most effective when the incremental increase in temperature is accomplished over a period of time exceeding about 30 minutes. While the defluorination will effectively proceed with the use of a faster rate of incremental temperature increase, it is preferred that the increase be accomplished over a period of time exceeding at least 30 minutes in order to insure effective removal of the fluorine values from the phosphate ore. While temperatures within the range of about 325° C. to about 500° C. can be used in the operation of the process of the present invention, it is preferred to use temperatures above 400° C. and more preferably temperatures within the range of about 425° C. to about 500° C.

While defluorination reaction proceeds fairly rapidly during the incremental heating of the reactants, it is preferred that heating at a temperature within the range of about 325° C. to about 500° C. be continued for a period of time of about at least 30 minutes and preferably over one hour to insure substantial completeness of the defluorination of the phosphate ore. Lesser times can be used depending on the amount of fluorine desired to be removed from the phosphate ore.

In some instances, and depending upon the type of ore utilized, the defluorination reaction may not proceed with a quantitative rapid elimination of the fluorine values from the phosphate ore. In these instances, the process can be repeated in order to insure substantially complete removal of the fluorine values by grinding the phosphate ore reaction product from the first treatment, followed by adjusting the moisture content of the reaction product to the limits within the range of about 1% to about 4% by weight of the reaction product with additional moisture, contacting the so-adjusted phosphate reaction product with additional sulfur trioxide and incrementally heating the contacted ore to a temperature within the range of about 325° C. to about 500° C. as in the first treatment. This additional process step can also be utilized when it is not desired to conduct the initial treatment of the phosphate ore for an extensive period of time as, for example, in a continuous process where the use of multiple steps might be more economical than the use of one extensive reaction step. Also, the ore could be recycled numerous times to effect substantially complete defluorination or to allow for the reduction in the holding times in the various steps of the process.

The product obtained from the reaction is a low fluorine-containing material which can be easily bagged or transported in bulk containers to the ultimate user. The product prepared by one sulfur trioxide treatment contains less than 1.0% by weight fluorine which is sufficiently low to allow its use as a feed supplement. The product prepared by recycling contains only trace amounts of fluorine (less than 0.1%) and is substantially completely defluorinated.

Example

High grade Florida fluorapatite ore which passes a 40 mesh screen is treated with water to form a thick slurry. The slurry is placed in an evaporating dish and allowed to air dry at ambient temperatures for 24 hours. The resulting dried solid, which has a moisture content of approximately 2.3% by weight based on the total weight of the ore, is ground and placed in a fluidized bed reaction column which is provided with an inlet at the lower end of the column for gaseous sulfur trioxide, a heating mantle around the reaction column and a by-product removal tube at the top of the column. Dry nitrogen gas as a carrier gas is bubbled through liquid sulfur trioxide in a sulfur trioxide generator extraneous to the reactor column to provide gaseous sulfur trioxide. The so-formed gaseous sulfur trioxide is passed into the reaction column through the inlet at the lower end of the column. The sulfur trioxide vapor is passed through the phosphate ore at ambient temperatures for approximately 30 minutes. While maintaining the sulfur trioxide flow, the temperature within the reaction column is then gradually increased to approximately 450° C. over a period of approximately 30 minutes and the reaction is continued for one hour at 450° C. The reaction product is then removed from the column, ground and a portion analyzed. The results are reported as Sample 2 in the table. Sample 1 in the table is the analysis of the original ore prior to reaction with $SO_3$.

Another portion of the reaction product is treated with water to form a slurry and air dried at ambient temperatures. This product is then subjected to a second sulfur trioxide treatment according to the procedure given above. Following the reaction, the product is ground and analyzed. The results are reported as Sample 3 in the table.

TABLE

| Sample No. | Description | Color | Percent S | Percent Ca | Percent F | Ca/F |
|---|---|---|---|---|---|---|
| 1 | Original ore | Tan | | 32.9 | 3.65 | 9.02 |
| 2 | Reaction product, single treatment | Light grey | 7.51 | 20.94 | 0.89 | 23.6 |
| 3 | Recycled reaction product | White | 8.20 | 24.07 | 0.05 | 4.82 |

As can be seen from the table, the fluorine values have been substantially removed from the ore by a single treatment with sulfur trioxide. The second treatment reduces the fluorine values to substantially trace amounts for feed stock purposes.

A repeat experiment using the procedure of the example with the exception that no moisture is added to the ore and a calcined sample of ore showed no reduction in the fluorine values.

Thus, and in accordance with the present invention, there is provided a method of defluorinating phosphate ore at temperatures lower than those presently used to the obvious economic advantage of the ore processor which entails contacting a fluorine-containing phosphate ore having an adjusted moisture content of about 1% to about 4% by weight with sulfur trioxide at ambient temperatures followed by incrementally increasing the temperature of the reaction mixture to an elevated temperature between the range of about 325° C. to 500° C. and continuing the reaction at the elevated temperature for a period of time sufficient to effect the desired defluorination. The product is a substantially fluorine-free phosphate material having a sufficiently low fluorine content to allow the use of the phosphate material as an animal feed supplement.

The invention is defined in the claims which follow.

What is claimed is:

1. A method of defluorinating fluorine-containing phosphate ore comprising:
   (1) contacting a fluorine-containing phosphate ore having a fluorine content of more than 3% by weight and an adjusted moisture content of between about 1% to about 4% by weight based on the total weight of said ore with sulfur trioxide at a temperature within the range of 10° C. to 60° C.;
   (2) Incrementally increasing the temperature from said contact temperature to an elevated temperature within the range of about 325° C. to about 500° C. over a period of at least 30 minutes while maintaining contact of said ore with said sulfur trioxide; and
   (3) Continuing said contact of said ore with said sulfur trioxide at said elevated temperature for a period of time sufficient to reduce the fluorine content of said ore to less than about 1% by weight.

2. A method as recited in claim 1 wherein said fluorine-containing ore is Florida fluorapatite.

3. A method as recited in claim 1 wherein said ore has a particle size of less than 30 mesh.

4. A method as recited in claim 1 wherein said moisture content is above 2%.

5. A method as recited in claim 1 wherein said ore is contacted with sulfur trioxide for at least 30 minutes at the said temperature within the range of 10° C. to 60° C.

6. A method as recited in claim 1 wherein said sulfur trioxide is in vapor form when said ore is initially contacted.

7. A method as recited in claim 1 wherein said contact of said ore with said sulfur trioxide is continued for at least 30 minutes at said elevated temperature.

8. A method as recited in claim 1 wherein said elevated temperature is within the range of about 425° C. to about 500° C.

9. A method as recited in claim 1 which includes the additional steps of:
   (1) Adjusting the moisture content of the product of step 3 of claim 1 by the addition of water to a point with said range of from about 1% to about 4%;
   (2) Contacting said product so adjusted with sulfur trioxide at a temperature within the range of 10° C. to 60° C.;
   (3) Incrementally increasing the temperature from said contact temperature to an elevated temperature within the range of about 325° C. to about 500° C. over a period of at least 30 minutes while maintaining contact of said ore with said sulfur trioxide; and
   (4) Continuing said contact of said ore with said sulfur trioxide at said elevated temperature for a period of time sufficient to effect further defluorination.

10. A method of defluorinating fluorine-containing phosphate ore comprising:
   (1) Placing a fluorine-containing phosphate ore having a fluorine content of more than 3% by weight and an adjusted moisture content of between about 1% and about 4% by weight based on the total weight of said ore in a fluidized bed reaction column;
   (2) Fluidizing said ore with vaporous sulfur trioxide at a temperature within the range of about 10° C. to about 60° C.;
   (3) Incrementally increasing the temperature within said column to an elevated temperature within the range of about 325° C. to about 500° C. over a period of at least 30 minutes while maintaining said ore in a fluidized state with said sulfur trioxide; and
   (4) Continuing said fluidization at said elevated temperature for a period of time sufficient to reduce the fluorine content of said ore to less than 1% by weight.

11. A method as recited in claim 10 wherein said ore is maintained in a fluidized state for at least 30 minutes at said temperature within the range of about 10° C. to about 60° C.

12. A method as recited in claim 10 wherein said contact of said ore with said sulfur trioxide is continued for at least 30 minutes at said elevated temperature.

13. A method as recited in claim 10 wherein said elevated temperature is within the range of about 425° C. to about 500° C.

References Cited

UNITED STATES PATENTS 3,364,008  1/1968  Hollingsworth et al. ---- 71—41

FOREIGN PATENTS 601,717  7/1960  Canada.

OTHER REFERENCES

Van Wagerz: Phosphorus and Its Compounds, vol. II, Interscience, Inc. New York and London, 1961, p. 1599.

OSCAR R. VERTIZ, *Primary Examiner.*

L. A. MARSH, *Assistant Examiner.*

U.S. Cl. X.R.

99—2